(12) United States Patent
Wang et al.

(10) Patent No.: US 7,894,182 B2
(45) Date of Patent: Feb. 22, 2011

(54) FLAT PANEL DISPLAY SUBASSEMBLY HAVING SPEAKER SECURED BY INTEGRATED SECURING STRUCTURE

(75) Inventors: Te-Hsu Wang, MiaoLi (TW); Zhao-Yu Wang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 1143 days.

(21) Appl. No.: 11/593,334

(22) Filed: Nov. 6, 2006

(65) Prior Publication Data

US 2007/0115619 A1 May 24, 2007

(30) Foreign Application Priority Data

Nov. 4, 2005 (CN) ............ 2005 1 0101016

(51) Int. Cl.
*G06F 1/16* (2006.01)
*H05K 5/00* (2006.01)
*H05K 7/00* (2006.01)

(52) U.S. Cl. .......... 361/679.23; 349/56; 381/306

(58) Field of Classification Search ........ 361/679.01, 361/679.02, 679.23; 381/452, 306, 333, 381/365, 355, 388, 412; 349/56, 58–60; 313/582

See application file for complete search history.

(56) References Cited

U.S. PATENT DOCUMENTS

| | | | | |
|---|---|---|---|---|
| 4,998,283 A * | 3/1991 | Nishida et al. | ............ | 381/388 |
| 5,139,319 A * | 8/1992 | Miyai et al. | ............ | 312/7.1 |
| 5,400,408 A * | 3/1995 | Lundgren et al. | ............ | 381/306 |
| 5,978,211 A * | 11/1999 | Hong | ............ | 361/679.23 |
| 6,134,335 A * | 10/2000 | Yang | ............ | 381/365 |
| 6,181,550 B1 * | 1/2001 | Kim | ............ | 361/679.06 |
| 6,205,229 B1 * | 3/2001 | Park | ............ | 381/388 |
| 6,275,595 B1 * | 8/2001 | Lundgren et al. | ............ | 381/306 |
| 6,335,974 B1 * | 1/2002 | Kunimoto | ............ | 381/306 |
| 6,339,418 B1 | 1/2002 | Kitagawa | | |
| 6,639,793 B2 * | 10/2003 | Lien et al. | ............ | 361/679.23 |
| 6,760,460 B1 * | 7/2004 | Jeon | ............ | 381/388 |
| 6,792,126 B2 * | 9/2004 | Okuno et al. | ............ | 381/412 |
| 6,798,654 B2 * | 9/2004 | Chang et al. | ............ | 361/679.23 |
| 6,807,051 B2 * | 10/2004 | Takahashi | ............ | 361/679.23 |
| 6,925,188 B1 * | 8/2005 | Markow et al. | ............ | 381/306 |
| 7,061,751 B2 * | 6/2006 | Hamada et al. | ............ | 361/679.23 |
| 7,120,265 B2 * | 10/2006 | Sperle et al. | ............ | 381/306 |
| 7,184,566 B2 * | 2/2007 | Tamura et al. | ............ | 381/388 |
| 7,280,665 B2 * | 10/2007 | Tamura et al. | ............ | 381/333 |
| 7,410,029 B2 * | 8/2008 | Tanaami | ............ | 181/156 |
| 7,447,009 B2 * | 11/2008 | Wang et al. | ............ | 361/679.32 |
| 2003/0059077 A1 * | 3/2003 | Kambe | ............ | 381/333 |

(Continued)

FOREIGN PATENT DOCUMENTS

CN    1591698 A    3/2005

*Primary Examiner*—Jayprakash N Gandhi
*Assistant Examiner*—Adrian S Wilson
(74) *Attorney, Agent, or Firm*—Wei Te Chung

(57) ABSTRACT

An exemplary flat panel display subassembly (1) includes a front frame (10), a back cover (12), and a speaker (14). The back cover is adjacent to the front frame. The speaker is adjacent to one of the front frame and the back cover, and defines a through hole (146) therein. One of the front frame and the back cover includes a securing structure (129) engaged in the through hole.

20 Claims, 9 Drawing Sheets

U.S. PATENT DOCUMENTS

| | | | |
|---|---|---|---|
| 2003/0076655 A1* | 4/2003 | Lien et al. | 361/686 |
| 2003/0076971 A1* | 4/2003 | Sperle et al. | 381/306 |
| 2003/0223609 A1* | 12/2003 | Anderson et al. | 381/333 |
| 2003/0223610 A1* | 12/2003 | Tanemura et al. | 381/334 |
| 2004/0240689 A1* | 12/2004 | Miyamoto | 381/306 |
| 2005/0047616 A1 | 3/2005 | Lee | |
| 2005/0047617 A1* | 3/2005 | Lee | 381/306 |
| 2005/0069159 A1* | 3/2005 | Nakazato | 381/306 |
| 2005/0117768 A1* | 6/2005 | Tamura et al. | 381/349 |
| 2005/0129263 A1* | 6/2005 | Tamura et al. | 381/333 |

\* cited by examiner

FLAT PANEL DISPLAY SUBASSEMBLY HAVING SPEAKER SECURED BY INTEGRATED SECURING STRUCTURE

CROSS-REFERENCE TO RELATED APPLICATION

This application is related to, and claims the benefit of, a foreign priority application filed in China as Application No. 200510101016.2 on Nov. 4, 2005. The related application is incorporated herein by reference.

FIELD OF THE INVENTION

The present invention relates to flat panel display (FPD) subassemblies, and more particularly to a flat panel display subassembly having a speaker secured by a securing structure that integrally extends from a front frame or a back cover of the FPD subassembly.

GENERAL BACKGROUND

Flat panel displays are commonly used as display devices for compact electronic apparatuses. Referring to FIG. 9, a typical flat panel display subassembly 9 includes a front frame 90, a back cover 92, and a pair of speakers 94. The front frame 90 and the back cover 92 cooperatively define a space (not labeled) for accommodating the speakers 94. Each speaker 94 includes a pair of ears 942 at two opposite sides (not labeled) thereof, respectively. Each ear 942 defines a through hole 944 therein. Two pairs of protrusions 922 extend into the space from the back cover 92. Each pair of protrusions 922 correspond to the through holes 944 of a corresponding pair of ears 942. Each protrusion 922 defines a blind hole 924 having a screw thread (not shown) therein.

In a process of assembly of the flat panel display subassembly 9, the through holes 944 of the ears 942 are aligned with the blind holes 924 of the protrusions 922 respectively. Four screws 96 are inserted through the through holes 944 and threadingly engaged in the respective blind holes 924. Thereby, the speakers 94 are secured inside the back cover 92. However, the need for the screws 96 makes the process of securing and removing the speakers 94 inconvenient. Further, the step of threadingly engaging the screws 96 is typically performed by manual labor, and adds to the cost of manufacturing the flat panel display subassembly 9.

What is needed, therefore, is a flat panel display subassembly that can overcome the above-described deficiencies.

SUMMARY

In one preferred embodiment, a flat panel display subassembly includes a front frame, a back cover, and a speaker. The back cover is adjacent to the front frame. The speaker is adjacent to one of the front frame and the back cover, and defines a through hole therein. One of the front frame and the back cover includes a securing structure engaged in the through hole.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
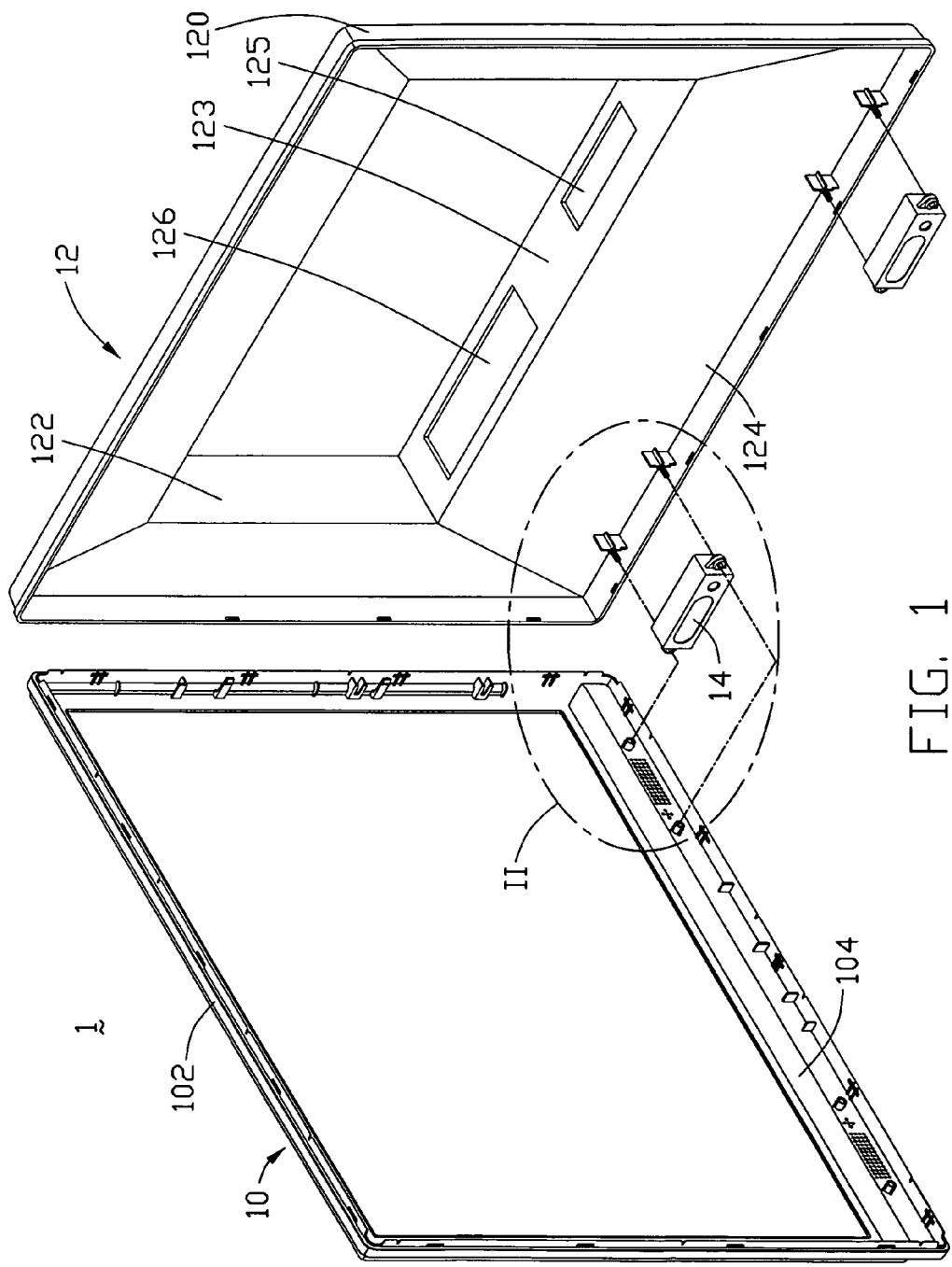
FIG. 1 is an exploded, isometric view of a flat panel display subassembly according to a first embodiment of the present invention, the flat panel display subassembly including a front frame, a back cover, and a pair of speakers.

Referring to FIG. 1, a flat panel display subassembly 1 according to a first embodiment of the present invention is shown. The flat panel display subassembly 1 includes a front frame 10, a back cover 12 adjacent to the front frame 10, and a pair of speakers 14.

Figure 2:
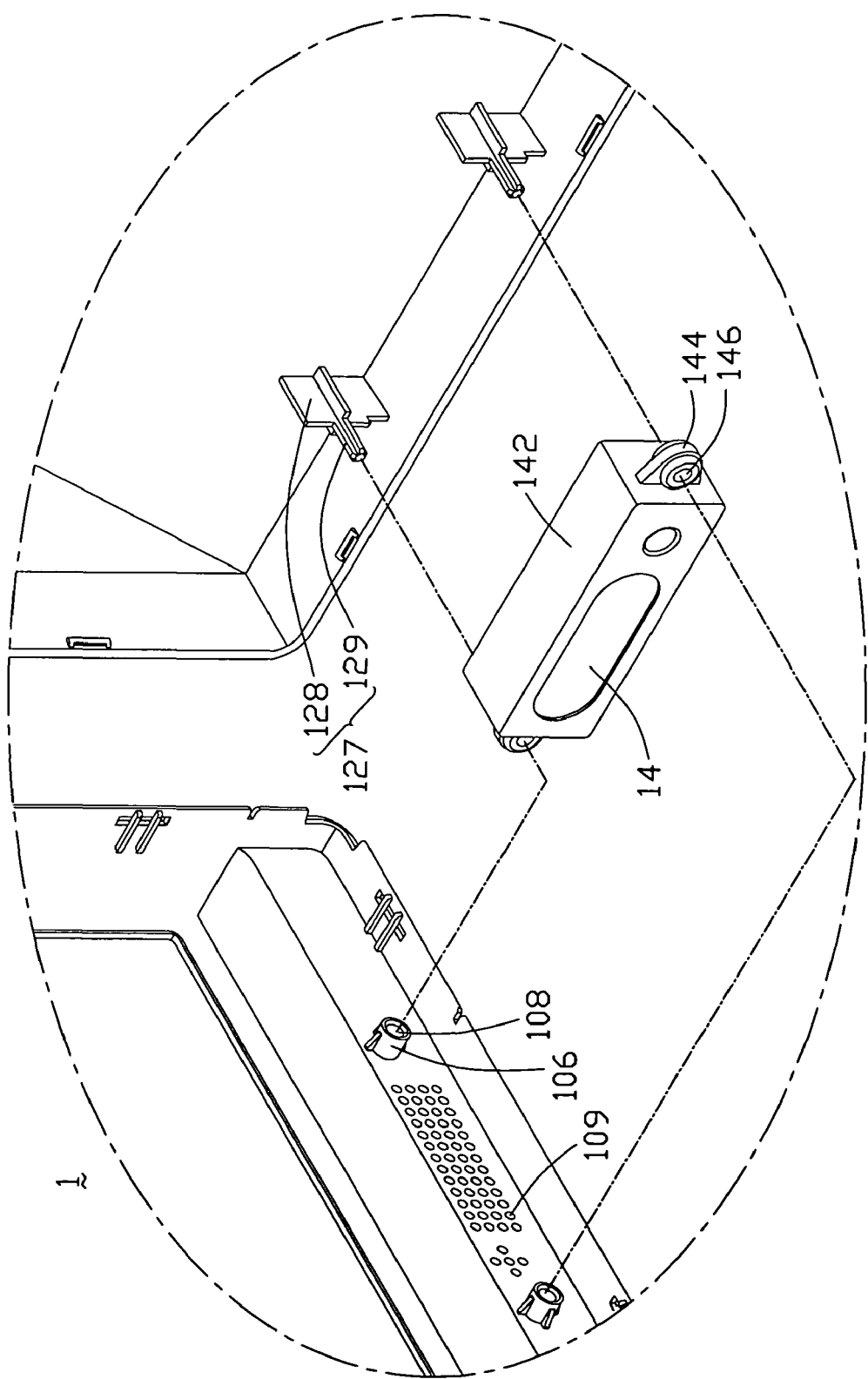
FIG. 2 is an enlarged view of a circled portion II of FIG. 1.
Figure 3:
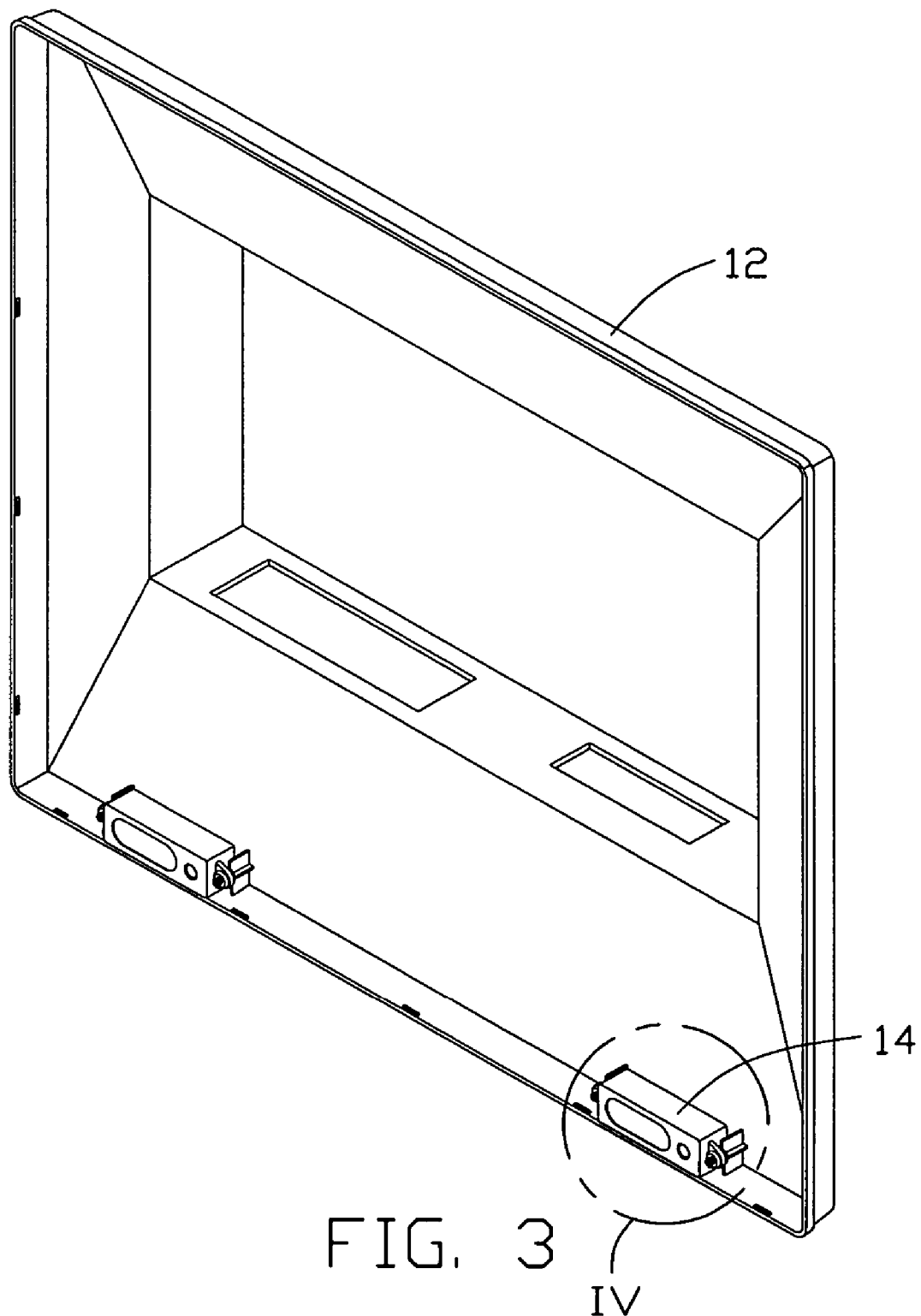
FIG. 3 is an assembled view of the back cover and the speakers of FIG. 1.
Figure 4:
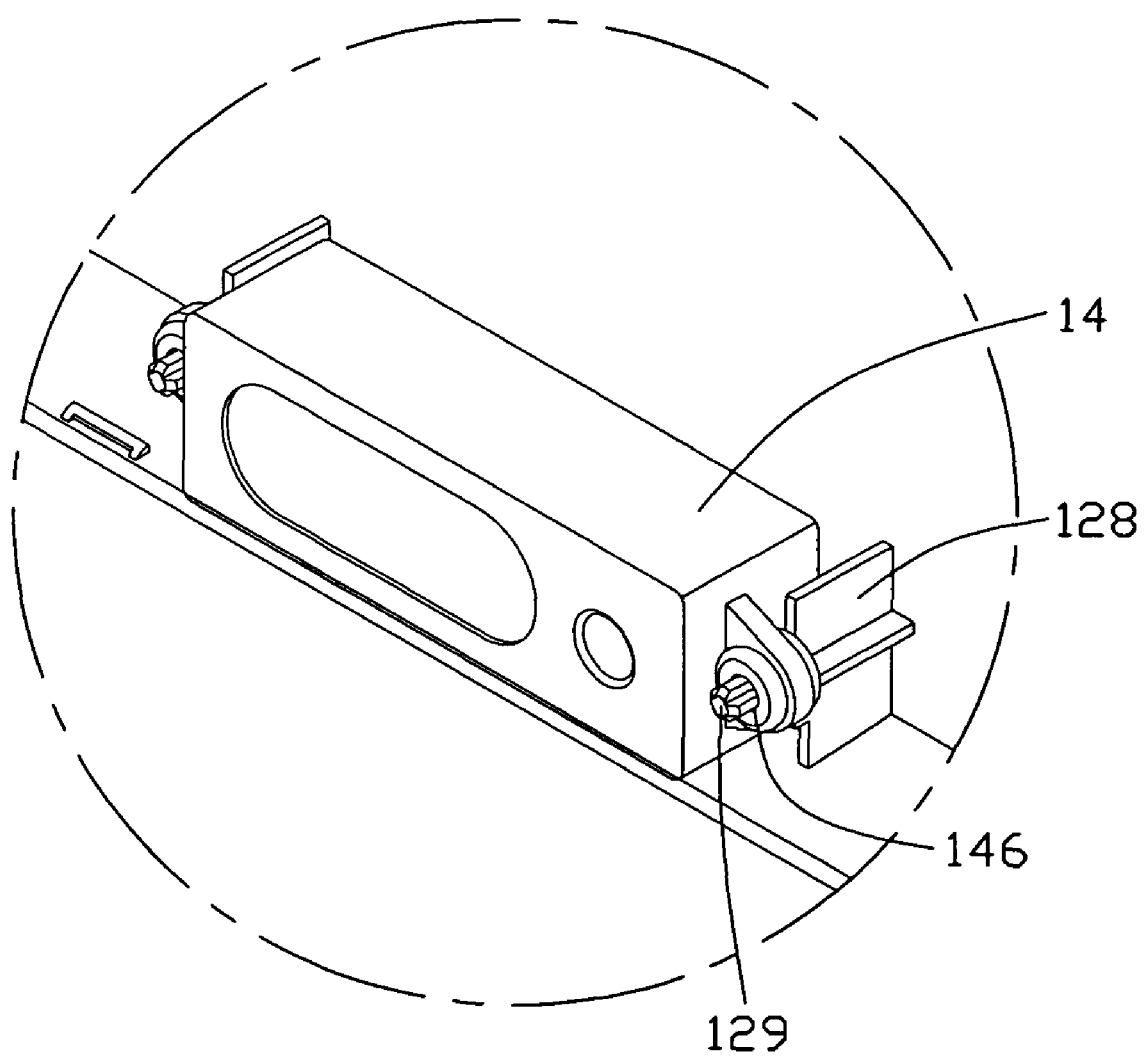
FIG. 4 is an enlarged view of a circled portion IV of FIG. 3.
Figure 5:
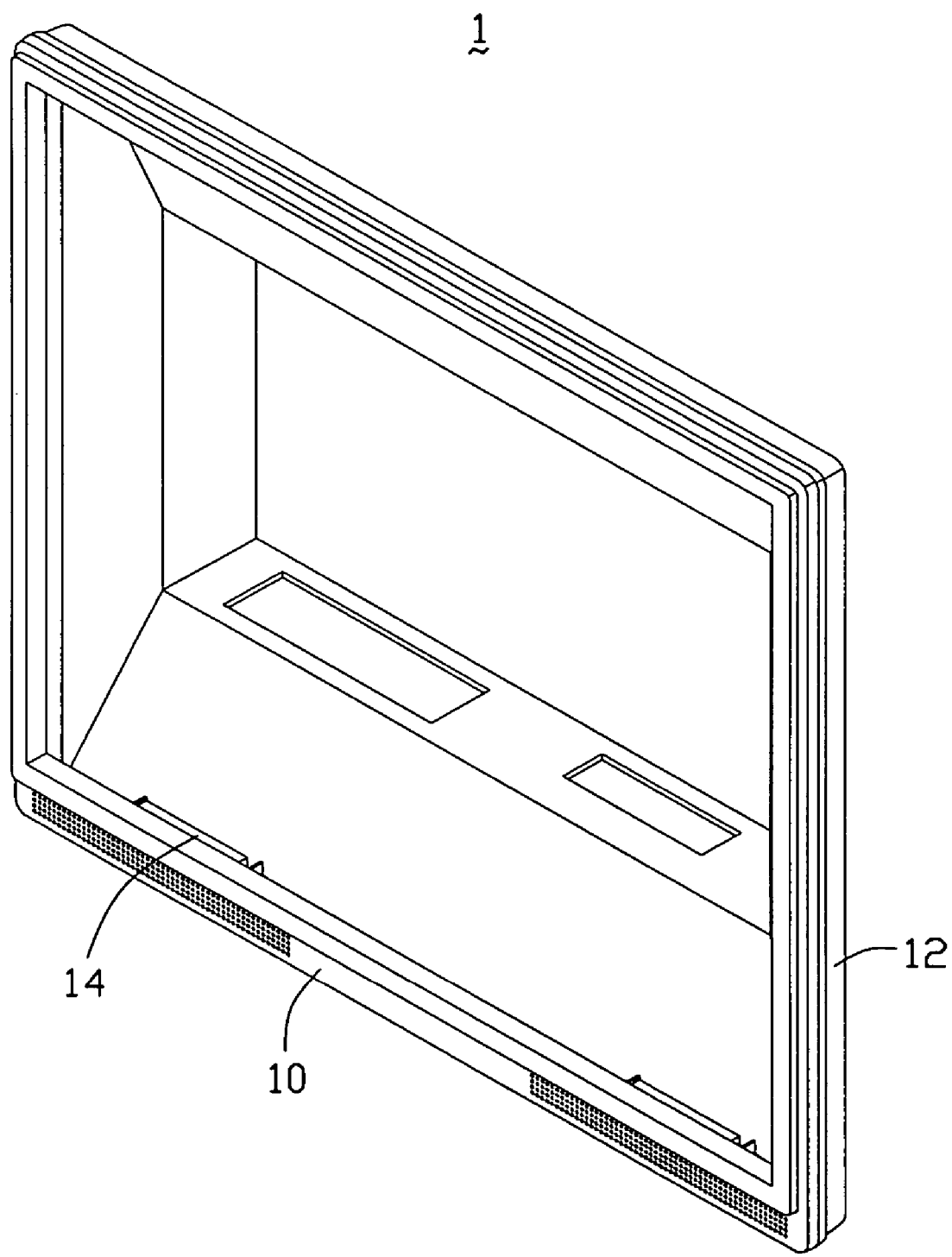
FIG. 5 is an assembled view of the flat panel display subassembly of FIG. 1.

Referring also to FIG. 2, each speaker 14 has a generally box-shaped main body 142, and a pair of ears 144. The ears 144 outwardly protrude from two opposite ends (not labeled) of the main body 142, respectively. Each ear 144 defines a through hole 146 therein. The speakers 14 can receive audio signals and broadcast sounds.

The back cover 12 includes a sub-frame 120, a sub-cover 122, and four side walls 124. The sub-frame 120 is generally rectangular, and has a size substantially the same as a size of the front frame 10. The sub-cover 122 is generally box-shaped. Each of the side walls 124 is planar. The side walls 124 cooperatively connect the sub-frame 120 with the sub-cover 122, with the sub-cover 122 defining an opening (not labeled) adjacent the side walls 124. Thus the sub-frame 120, the side walls 124, and the sub-cover 122 cooperatively define a space (not labeled), which is for accommodating a display panel (not shown), a printed circuit board (not shown), and other components of a corresponding flat panel display that utilizes the flat panel display subassembly 1. The sub-cover 120 further defines two hatches 125, 126 in a bottom wall 123 thereof. The back cover 12 is preferably made from iron, steel, aluminum, magnesium, or a suitable alloy.

The back cover 12 further includes two pairs of securing structures 127 integrally formed at the sub-frame 120. The securing structures 127 protrude perpendicularly inwardly from a bottom portion (not labeled) of the sub-frame 120. Each securing structure 127 includes a cross-shaped root 128, and a securing column 129 extending from the root 128. The securing column 129 has a plurality of parallel ridges (not labeled) thereon. Each securing column 129 corresponds to the through hole 146 of a respective ear 144. A diameter of each securing column 129 is approximately the same as a diameter of the through hole 146.

The front frame 10 includes four side walls 102 connected end to end, thus defining a window (not labeled) for allowing viewing of the display panel. A bar-shaped base 104 is located at a bottom portion (not labeled) of the front frame 10. The base 104 includes two pairs of protrusions 106 extending toward the ears 144 of the speakers 14. Each protrusion 106 defines a securing hole 108 therein. A plurality of parallel grooves (not shown) is defined in the protrusion 106 around and in communication with the securing hole 108. The grooves correspond to the ridges of a respective one of the securing columns 129. The base 104 further defines two sets of vent holes 109 therein. Each set of vent holes 109 is located between the protrusions 106 of one pair of the protrusions 106, and corresponds to the main body 142 of a respective speaker 14.

The speakers 14 are secured in the flat panel display subassembly 1 according to the following steps: first, the speakers 14 are aligned with the securing structures 127 such that the securing columns 129 correspond to the respective through holes 146; second, the speakers 14 are pressed onto the securing structures 127, with the securing columns 129 penetrating the through holes 146 respectively; third, the front frame 10 is aligned with the back cover 12 having the speakers 14 fixed therewith such that the securing columns 129 correspond to the respective securing holes 108; and finally, the front frame 10 and the back cover 12 are pressed toward each other, such that the securing columns 129 penetrate into the securing holes 108 along the grooves respectively and are thereby engaged in the securing holes 108. Thus the speakers 14 are secured without the need for providing any screws, and without the need for engaging any screws. Further, when the speakers 14 are removed from the flat panel display subassembly 1, there is no need for disengaging any screws. In summary, the speakers 14 can be secured to or removed from the flat panel display subassembly 1 conveniently.

Figure 6:
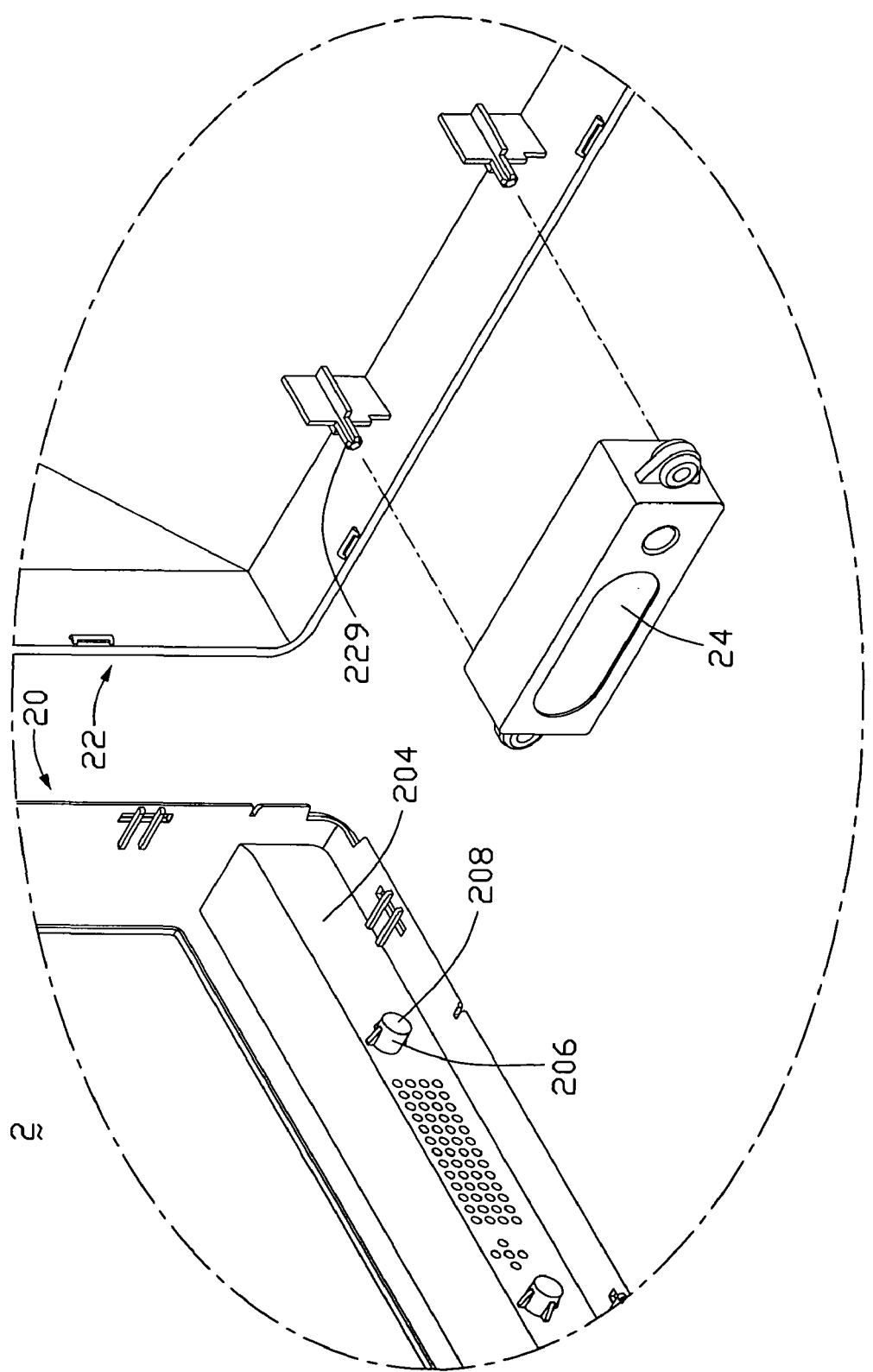
FIG. 6 is similar to FIG. 2, but showing a corresponding view in the case of a flat panel display subassembly according to a second embodiment of the present invention.

Referring to FIG. 6, a flat panel display subassembly 2 according to a second embodiment of the present invention is similar to the flat panel display subassembly 1. However, a front frame 20 of the flat panel display subassembly 2 includes a base 204 located adjacently in front of speakers 24. Two pairs of protrusions 206 extend inwardly from the base 204. Each protrusion 206 has a flat distal end face 208 facing one ear (not labeled) of a respective speaker 24. Two pairs of securing columns 229 extend inwardly from a back cover 22 of the flat panel display subassembly 2. Each securing column 229 extends through one ear of a respective speaker 24. The securing column 229 may for example be fittingly received in the ear or interferingly engaged in the ear. The distal end face 208 of the corresponding protrusion 206 stops the securing column 229. Thereby, each of the speakers 24 is cooperatively secured by the corresponding securing columns 229 and corresponding distal end faces 208. The flat panel display subassembly 2 can achieve advantages similar to those of the flat panel display subassembly 1.

Figure 7:
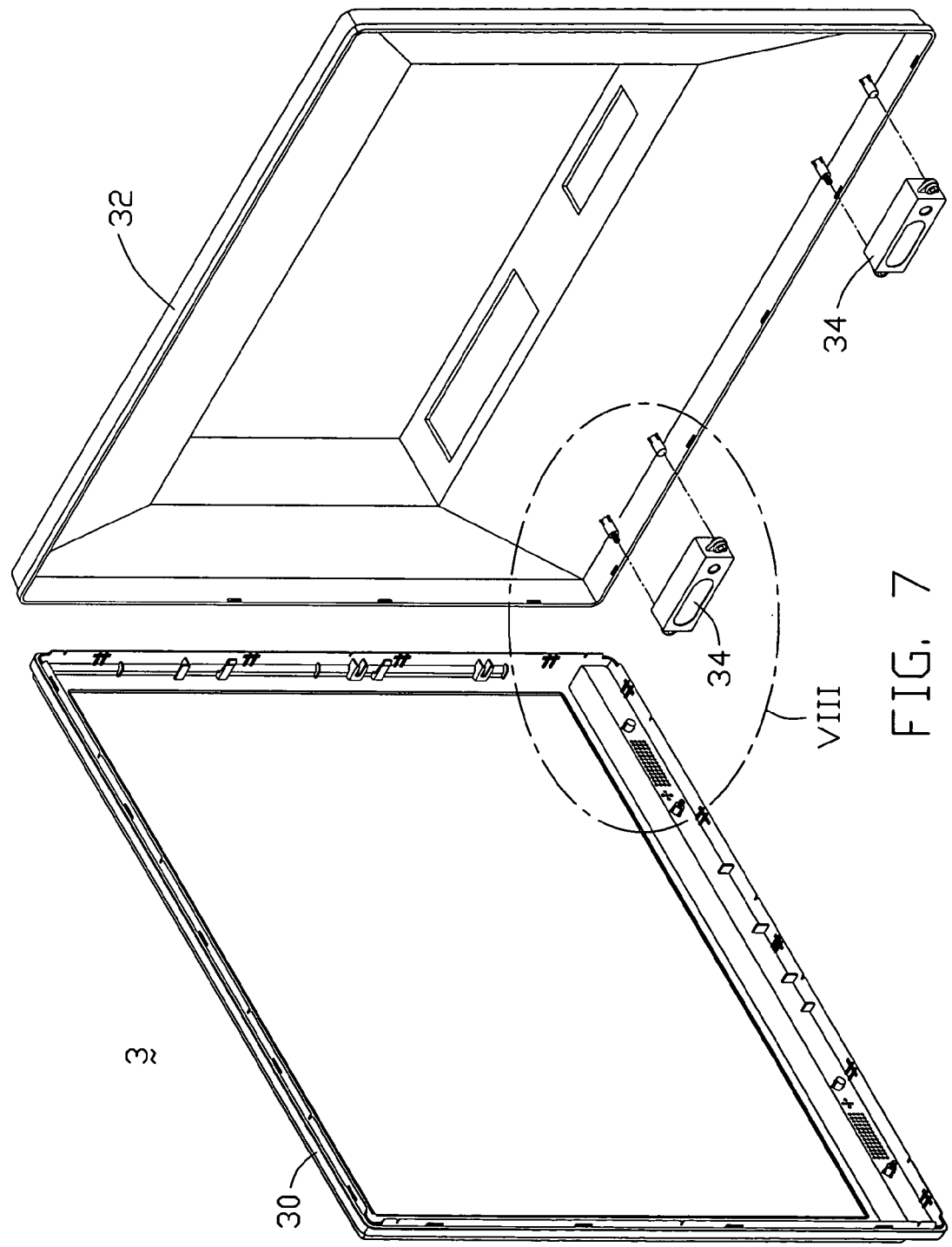
FIG. 7 is an exploded, isometric view of a flat panel display subassembly according to a third embodiment of the present invention.
Figure 8:
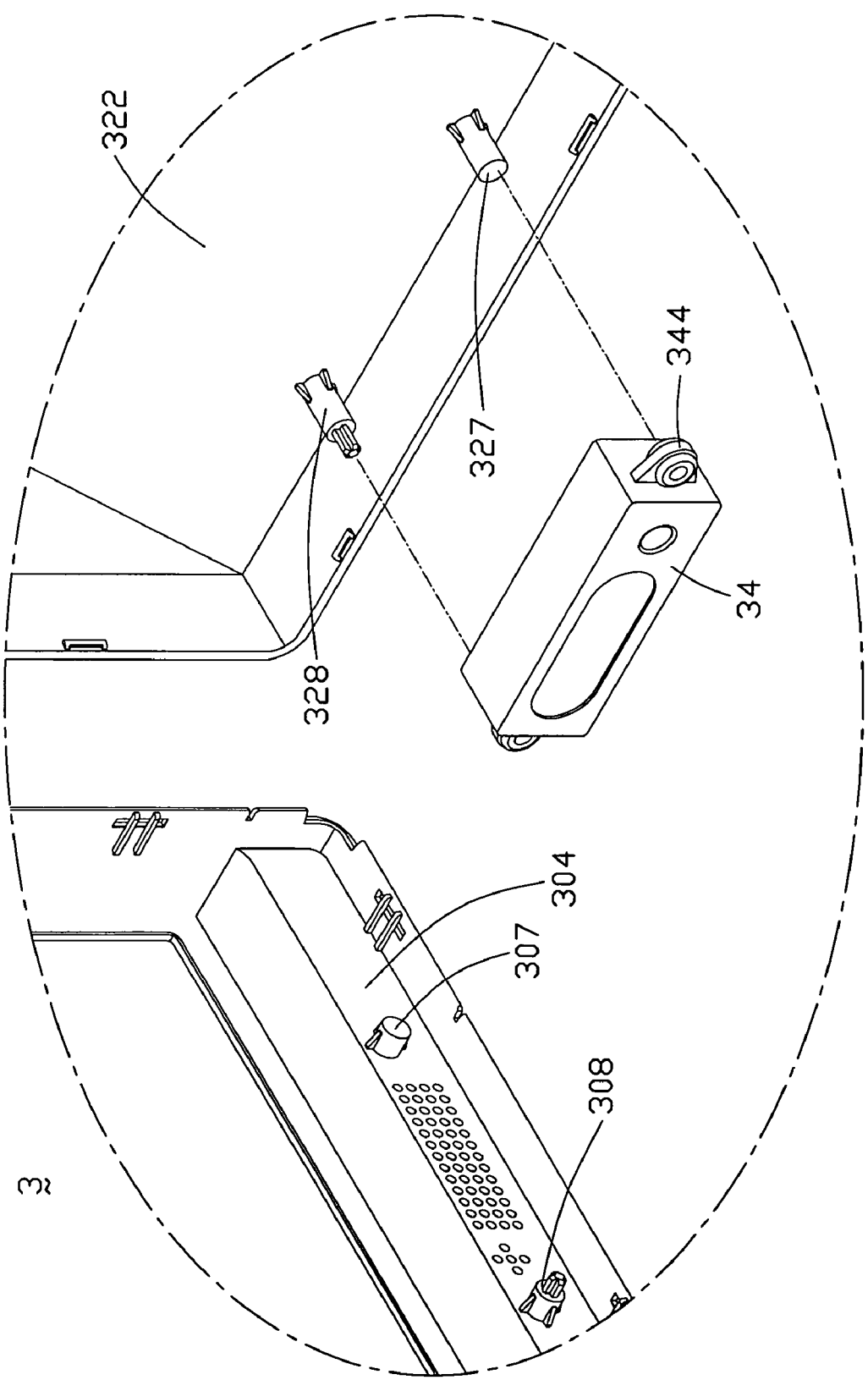
FIG. 8 is an enlarged view of a circled portion VIII of FIG. 7.
Figure 9:
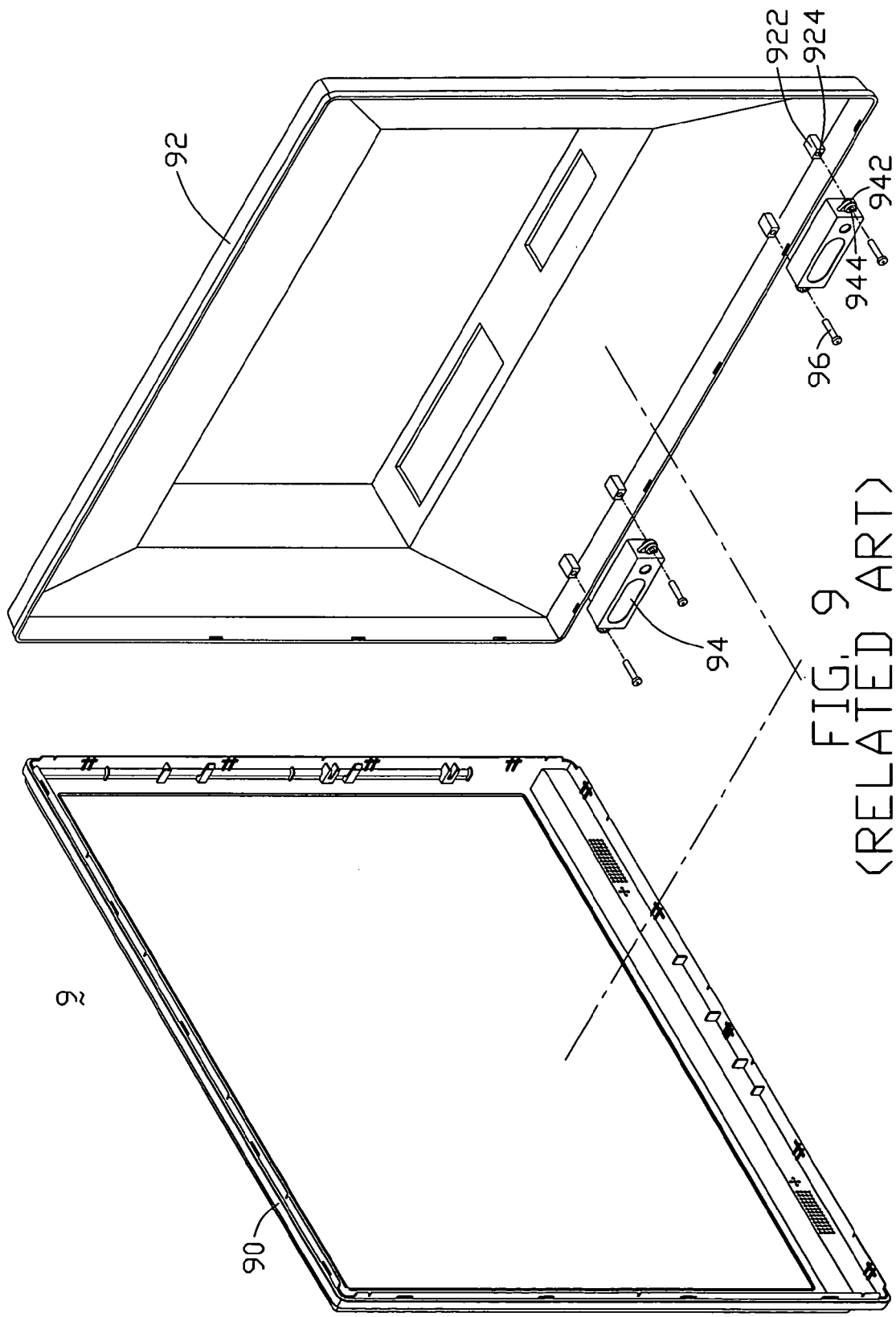
FIG. 9 is an exploded, isometric view of a conventional flat panel display subassembly.

Referring to FIG. 7, a flat panel display subassembly 3 according to a third embodiment of the present invention is shown. The flat panel display subassembly 3 includes a front frame 30, a back cover 32, and a pair of speakers 34. Referring also to FIG. 8, two pairs of back securing elements (not labeled) are provided on a side wall 322 of the back cover 32. Each pair of back securing elements includes a back protrusion 327 and a back securing structure 328, which extend from the side wall 322 toward the front frame 30. Two pairs of front securing elements (not labeled) are provided on a base 304 of the front frame 30. Each pair of front securing elements includes a front protrusion 307 and a front securing structure 308, which extend from the base 304 toward the back cover 32. Each pair of front securing elements corresponds to a respective one of the pairs of back securing elements. In a securing element group having one pair of front securing elements and one pair of back securing elements, the front protrusion 307 corresponds to the back securing structure 328, and the front securing structure 308 corresponds to the back protrusion 327. A distal end face (not labeled) of the front protrusion 307 is flat, and a distal end face (not labeled) of the back protrusion 327 is flat. When one of the speakers 34 corresponding to the securing element group is secured in the flat panel display subassembly 3, the front protrusion 307 and the back securing structure 328 cooperatively secure one of ears 344 of the speaker 34, and the back protrusion 327 and the front securing structure 308 cooperatively secure the other ear 344 of the speaker 34. The flat panel display subassembly 3 can achieve advantages similar to those of the flat panel display subassembly 2.

Further or alternative embodiments may include the following. In one example, the securing structures and the protrusions can be arranged at selected of the front frame and/or the back cover alternately. In another example, each speaker can define one or more through holes in the main body thereof. For instance, one through hole can be defined in a bottom portion of the main body, and another through hole can be defined in a top portion of the main body.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display subassembly comprising:
a front frame;
a back cover adjacent to the front frame; and
a speaker adjacent to one of the front frame and the back cover, the speaker comprising an ear, and the ear defining a first through hole therein;
wherein one of the front frame and the back cover comprises a securing structure, the securing structure comprises a root and a securing column extending from the root, the securing column goes through the ear via the first through hole such that the ear abuts against the root, the other one of the front frame and the back cover comprises a protrusion with a hole, and a portion of the securing column that exceeds the first through hole is received in the hole of the protrusion, such that the protrusion cooperating with the root stops movements of the ear along the securing column.

2. The flat panel display subassembly in claim 1, wherein the front frame comprises a base located adjacent to the speaker.

3. The flat panel display subassembly in claim 2, wherein the securing structure extends inwardly from the base such that the securing column is engaged in the first through hole.

4. The flat panel display subassembly in claim 1, wherein the back cover comprises a sub-frame adjacent to the front frame.

5. The flat panel display subassembly in claim 4, wherein the securing structure extends inwardly from a bottom portion of the sub-frame such that the securing column is engaged in the first through hole.

6. The flat panel display subassembly in claim 4, wherein the back cover further comprises a plurality of side walls connecting with the sub-frame.

7. The flat panel display subassembly in claim 6, wherein the securing structure extends from one of the side walls adjacent to the speaker such that the securing structure is engaged in the first through hole.

8. The flat panel display subassembly in claim 1, wherein the speaker further defines a second through hole opposite to the first through hole.

9. The flat panel display subassembly in claim 8, wherein the front frame and the back cover each comprise a securing structure, and two securing columns of the securing structures are respectively engaged in the first through hole and the second through hole.

10. The flat panel display subassembly in claim 1, wherein the securing column comprises a plurality of parallel ridges.

11. The flat panel display subassembly in claim 1, wherein the back cover is made from iron, steel, aluminum, magnesium, or alloy.

12. A flat panel display subassembly comprising:
a front frame;
a back cover cooperating with the front frame to form a space therebetween; and
a speaker located in the space, the speaker being secured by at least one securing structure integrally extending either from the front frame or from the back cover or from both the front frame and the back cover, wherein the speaker comprises at least one ear each defining a through hole therein, each securing structure comprises a root and a securing column extending from the root, the securing column goes through a corresponding ear via the through hole so that the corresponding ear abuts against the root, either the back cover or the front frame or both the back cover and the front frame comprises at least one protrusion, and the at least one protrusion cooperating with a corresponding root stops movements of a corresponding ear along a corresponding securing column.

13. The flat panel display subassembly in claim 12, wherein the at least one protrusion comprises a flat distal end face oppositely stopping the securing column of the corresponding securing structure.

14. The flat panel display subassembly in claim 12, wherein the at least one protrusion comprises a securing hole engagingly receiving the securing column of the corresponding securing structure.

15. The flat panel display subassembly in claim 14, wherein the securing column comprises a plurality of parallel ridges, and a plurality of grooves are defined in a wall of the securing hole for engagingly receiving the parallel ridges of the securing column.

16. The flat panel display subassembly in claim 12, wherein a diameter of each securing column is approximately equal to a diameter of a corresponding through hole.

17. The flat panel display subassembly in claim 12, wherein the root is a cross-shaped root, and a diameter of the securing column is less than a maximum diameter of the root.

18. The flat panel display subassembly in claim 1, wherein a diameter of the securing column is approximately equal to a diameter of the first through hole.

19. The flat panel display subassembly in claim 1, wherein the root is a cross-shaped root.

20. The flat panel display subassembly in claim 19, wherein a maximum diameter of the root is greater than a diameter of the securing column.

* * * * *